US007476714B2

(12) United States Patent
Pabon et al.

(10) Patent No.: US 7,476,714 B2
(45) Date of Patent: Jan. 13, 2009

(54) FLUOROCARBON-GRAFTED POLYSILOXANES

(75) Inventors: Martial Jean-Jacques Pabon, Neauphlette (FR); Romain Severac, La Roche Guyon (FR); Emmanuel Abel Jean-Mark Puchois, Epone (FR); Matthieu Perdon, Seraincourt (FR)

(73) Assignee: E.I. DuPont De Nemours, Wilmington, DE (US)

( * ) Notice: Subject to any disclaimer, the term of this patent is extended or adjusted under 35 U.S.C. 154(b) by 405 days.

(21) Appl. No.: 11/132,836

(22) Filed: May 19, 2005

(65) Prior Publication Data
US 2006/0178494 A1 Aug. 10, 2006

(30) Foreign Application Priority Data
Feb. 4, 2005 (FR) .................. 05 290254

(51) Int. Cl.
C08G 77/388 (2006.01)
(52) U.S. Cl. ...................... 525/474; 428/447
(58) Field of Classification Search .......... 428/447; 525/474
See application file for complete search history.

(56) References Cited

U.S. PATENT DOCUMENTS

| 3,012,006 | A | 12/1961 | Holbrook et al. |
| 3,232,875 | A | 2/1966 | Young et al. |
| 3,859,320 | A | 1/1975 | Atherton |
| 3,903,123 | A | 9/1975 | Deiner et al. |
| 4,238,382 | A | 12/1980 | Uphoff |
| 4,301,103 | A | 11/1981 | Uphoff |
| 4,488,771 | A | 12/1984 | Koford |
| 5,041,588 | A | 8/1991 | Caporiccio |
| 5,215,580 | A | 6/1993 | Elfenthal et al. |
| 5,260,400 | A | 11/1993 | Karydas |
| 5,348,769 | A | 9/1994 | Gambale et al. |
| 5,385,999 | A | 1/1995 | D'Anvers et al. |
| 6,465,056 | B1 | 10/2002 | Chabrecek et al. |
| 6,579,608 | B1 | 6/2003 | Kondo |
| 6,586,038 | B1 | 7/2003 | Chabrecek et al. |
| 6,815,482 | B1 | 11/2004 | Hirn et al. |
| 2001/0034397 | A1 | 10/2001 | Eggers et al. |

FOREIGN PATENT DOCUMENTS

| EP | 467 852 A2 | 7/1991 |
| GB | 1093898 | 12/1967 |
| GB | 1546607 | 5/1979 |
| JP | 63150350 | 6/1988 |
| WO | WO 95/00577 | 1/1995 |
| WO | WO 02/18484 A2 | 3/2002 |

OTHER PUBLICATIONS

Freeman "Silicones" Published for the Plastics Institute (1962) p. 27.*
Tan et al., *Synthesis of Ultraviolet-Curable Modified Polysiloxane and its Surface Properties*. Journal of Applied Polymer Science (2002), 88(9), 2135-2139. Wiley Periodicals, Inc., U.S.A.
Lin et al. *Fluorinated Siloxane Amine Oligomers*, Journal of Applied Polymer Science (2000), 78(7), 1315-1320. Wiley Periodicals, Inc., U.S.A..
Rizzo et al., Synthesis and Thermal Properties of Fluorosilicones Containing Perfluorocyclobutane Rings, Polymer (2000). 41(13), 5125-5136. Elsevier Science Ltd., USA.
Ameduri et al., *Use of Original Fluorinated Telomers in the Synthesis of Hybrid Silicones*. Fluoropolymers (1999), vol. 1, 67-80. Kluwer Academic/Plenum Publishers, New York, New York, USA. Abstract.
Andrianov et al., Telomerization of Dimethylcyclosiloxanes. II. Preparation of Linear—Chloro—Trimethylsiloxydimethylsiloxanes. Izvestiya Akademii Nauk SSSR, Seriya Khimicheskaya (1961) 1610-15. Abstract.

* cited by examiner

Primary Examiner—Kuo-Liang Peng
(74) Attorney, Agent, or Firm—Anthony Chi

(57) ABSTRACT

A composition useful to provide oil repellency, water repellency, and stain resistance to substrates comprising a polymer prepared by contacting a polyfluoroalkyl sulfonyl halide with a compound of Formula II, III or IV $(E-(O)_q)_3Si-O-(Si(R^2)_2-O)_m-[Si(R^3-NHR^4)(R^2)O]_n-Si-((O)_q-E)_3$      Formula II $HR^4N-R^3-Si(R^2)_2-O-[Si(R^2)_2-O]_m-[Si(R^3-NHR^4)(R^2)O]_n-Si(R^2)_2-R^3-NHR^4$      Formula III $HR^4N-R^3-Si(R^2)_2-O-[Si(R^2)_2-O]_m-Si-((O)_q-E)_3$      Formula IV wherein
each $R^2$ is independently a $C_1$ to $C_8$ alkyl,
each $R^3$ is independently a divalent group containing carbon, oxygen, and optionally at least one of nitrogen oxygen and sulfur,
each $R^4$ is independently H or $C_1$ to $C_8$ alkyl,
each E is independently a $C_1$ to $C_8$ branched or linear alkyl,
each q is independently zero or 1,
m is a positive integer, and n is independently zero or a positive integer, such that n/(m+n) is zero or a positive fraction having a value up to about 0.7, and the polymer viscosity is less than or equal to 10000 mPa·s under a shear rate of 0.1 s$^{-1}$ at a temperature of 20° C.

20 Claims, No Drawings

FLUOROCARBON-GRAFTED POLYSILOXANES

BACKGROUND OF THE INVENTION

Siloxane- and fluorochemical-based compositions have been disclosed for the protection of hard substrate surfaces, e.g., mineral substrates, and for soft substrate surfaces, such as fibrous substrates. While siloxane-based treatments provide water repellency at a relatively low price per square meter and with good weathering resistance, they are marginal in oil repellency and soil repellency (for instance, see Stempf, A.; Muller, P.; Pabon, M.; Corpart, J. M. *Int. J. Restoration Buildings & Monuments* 1999, 5, 273-288). Fluorochemical-based treatments provide both oil and water repellency but are relatively expensive due to the necessary high fluorine content.

Atherton, in U.S. Pat. No. 3,859,320, disclosed compounds with perfluoroalkyl groups ($R_f$) attached via an oxygen and/or an alkylene group and through a sulfonamide group to an amine-substituted poly(dialkylsiloxane) as in Structure 1 below, wherein —($C_6H_4$)—O— or —CH=CH—O— is between the $R_f$ and the $SO_2$ groups. Compounds of Structure 1 are relatively difficult to synthesize compared to those that do not contain and oxygen and/or alkylene group between the $R_f$ and $SO_2$ groups.

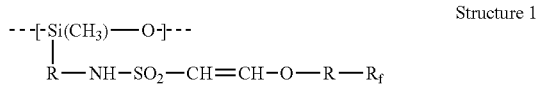

Structure 1

It is desirable to combine the advantages of siloxanes and fluorochemicals to provide improved oil, water, and stain repellency for hard and soft surfaces with compounds that are easy to synthesize. It is also desirable that such compounds have improved fluorine efficiency. The present invention provides such a composition.

SUMMARY OF THE INVENTION

The present invention comprises a composition comprising a perfluoroalkylsulfonamide-grafted poly(alkylsiloxane) polymer prepared by contacting a polyfluoroalkyl sulfonyl halide of formula I

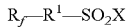   I wherein $R_f$ is a straight or branched perfluoroalkyl group having from about 2 to about 20 carbon atoms, $R^1$ is a divalent linking group $C_kH_{2k}$ wherein k is 0 to about 20, and X is halogen, with a silane compound of Formula II, III or IV

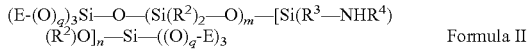   Formula II

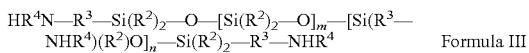   Formula III

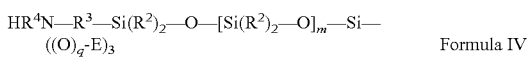   Formula IV wherein each $R^2$ is independently a $C_1$ to $C_8$ alkyl, each $R^3$ is independently a divalent group containing carbon, oxygen, and optionally at least one of nitrogen oxygen and sulfur, each $R^4$ is independently H or $C_1$ to $C_8$ alkyl, each E is independently a $C_1$ to $C_8$ branched or linear alkyl, each q is independently zero or 1, m is a positive integer, and n is independently zero or a positive integer, such that n/(m+n) is zero or a positive fraction having a value up to about 0.7, and the polymer viscosity is less than or equal to 10000 mPa·s under a shear rate of 0.1 $s^{-1}$ at a temperature of 20° C.

The present invention further comprises a process for the preparation of a perfluoroalkylsulfonamide-grafted poly(alkylsiloxane) comprising contacting a polyfluoroalkyl sulfonyl halide of formula I

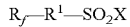   I wherein $R_f$ is a straight or branched perfluoroalkyl group having from about 2 to about 20 carbon atoms, $R^1$ is a divalent linking group $C_kH_{2k}$ wherein k is 0 to about 20, and X is halogen, with a silane compound of Formula II, III or IV

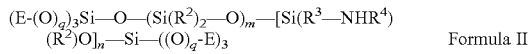   Formula II

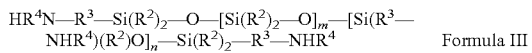   Formula III

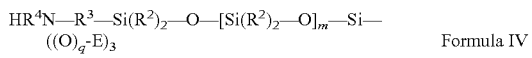   Formula IV wherein each $R^2$ is independently a $C_1$ to $C_8$ alkyl, each $R^3$ is independently a divalent group containing carbon, oxygen, and optionally at least one of nitrogen oxygen and sulfur, each $R^4$ is independently H or $C_1$ to $C_8$ alkyl, each E is independently a $C_1$ to $C_8$ branched or linear alkyl, each q is independently zero or 1, m is a positive integer, and n is independently zero or a positive integer, such that n/(m+n) is zero or a positive fraction having a value up to about 0.7, and the polymer viscosity is less than or equal to 10000 mPa·s under a shear rate of 0.1 $s^{-1}$ at a temperature of 20° C.

The present invention further comprises a method of providing oil repellency, water repellency, and stain resistance to substrate surfaces comprising contacting said surface with a polymer composition as described above.

The present invention further comprises a substrate treated according to the above method.

DETAILED DESCRIPTION

Tradenames are shown herein in upper case.

The present invention provides compounds combining the advantages of siloxanes and fluorochemical compounds and having improved fluorine efficiency. By "fluorine efficiency" is meant the ability to use a minimum amount of fluorochemical to obtain repellency properties equivalent to those obtained using a higher level of fluorine when applied to a hard or soft substrate.

The present invention comprises a polymer formed by contacting at least one poly(dialkylsiloxane) having amine-terminated side chains, amine-terminated end group(s), or both, with at least one perfluoroalkylethyl sulfonyl halide having the structure of Formula I in a suitable inert solvent and optionally but preferably in the presence of a suitable acid receptor. Polyfluoroalkyl sulfonyl halides suitable for the practice of the present invention have the following structure:

$$R_f\text{—}R^1\text{—}SO_2X \qquad \text{Formula I}$$

wherein $R_f$ is a straight or branched perfluoroalkyl group having from about 2 to about 20 and preferably from about 4 to about 16 carbon atoms, $R^1$ is a divalent linking group —$C_kH_{2k}$— where k is 0 to about 20, preferably 0 to about 10, and more preferably 0 to about 2, and X is a halogen selected from F, Cl, Br, or I, and is preferably Cl or Br. Preferred are perfluoroalkylethyl sulfonyl chlorides and mixtures thereof having the formula $F(CF_2CF_2)_p$ $CH_2CH_2SO_2Cl$, wherein p is 1 to about 10 and preferably from about 2 to about 8, more preferably from about 4 to about 6, and mixtures thereof. Such polyfluoroalkyl sulfonyl halides are readily prepared by methods well known to those skilled in the art, for instance by the reaction of thionyl chloride with the selected perfluoroalkylethyl sulfonic acid or mixtures of perfluoroalkylethyl sulfonic acids, available from E. I. du Pont de Nemours and Company, Wilmington Del.

Hereinafter, such a product is termed a "perfluoroalkylsulfonamide-grafted poly(alkylsiloxane)".

The poly(dialkylsiloxane) having amine-terminated side chains and/or terminal end group(s) used in the practice of the present invention has the structure of Formulae II, III, or IV or a mixture thereof:

$$(E\text{-}(O)_q)_3Si\text{—}O\text{—}(Si(R^2)_2\text{—}O)_m\text{—}[Si(R^3\text{—}NHR^4)$$
$$(R^2)O]_n\text{—}Si\text{—}((O)_q\text{-}E)_3 \qquad \text{Formula II (side chain amine)}$$

$$HR^4N\text{—}R^3\text{—}Si(R^2)_2\text{—}O\text{—}[Si(R^2)_2\text{—}O]_m$$
$$[\text{—}Si(R^3\text{—}NHR^4)(R^2)O]_n\text{—}Si(R^2)_2\text{—}R^3\text{—}$$
$$NHR^4 \qquad \text{Formula III (terminal diamine)}$$

$$HR^4N\text{—}R^3\text{—}Si(R^2)_2\text{—}O\text{—}[Si(R^2)_2\text{—}O]_m\text{—}Si\text{—}$$
$$((O)_q\text{-}E)_3 \qquad \text{Formula IV (terminal monoamine)}$$

wherein each $R^2$ is independently selected from $C_1$ to $C_8$ alkyl groups and are preferably $C_1$ to $C_4$ alkyl groups, more preferably methyl, each $R^3$ is independently selected from divalent groups containing carbon, hydrogen, and optionally at least one of nitrogen, oxygen, and sulfur, each $R^4$ is independently H or $C_1$-$C_8$ alkyl, each E group is independently the same or different $C_1$-$C_8$ branched or linear alkyl end group and is inert under the reaction conditions.

each q is independently 0 or 1, m is a positive integer, and n is independently zero or a positive integer, such that n/(m+n) is zero or a positive fraction having a value up to about 0.7, and such that the product viscosity is lower than or equal to 10000 mPa·s under a shear rate of 0.1 s$^{-1}$ at a temperature of 20° C., The amine substituted poly(dimethylsiloxanes) are potentially available in a range of molecular weights and having corresponding viscosities. The preparation of such amine-substituted poly(dialkylsiloxanes) is well known to those skilled in the art. The reaction of dialkyldihydroxysilane, $(HO)_2Si(C_xH_{(2x+1)})_2$, and alkylaminodihydroxysilane, $(HO)_2Si(C_yH_{2y}NH_2)(C_xH_{(2x+1)})$, provides dihydroxy-terminated amine-substituted poly(dialkylsiloxanes). Further reaction with trialkylhydroxysilane, $(HO)Si(C_xH_{(2x+1)})_3$, creates trialkyl-terminated amine-substituted poly(dialkylsiloxanes), or, alternatively, further reaction with trialkoxychlorosilane, $ClSi(OC_xH_{(2x+1)})_3$, creates trialkoxy-terminated amine-substituted poly(dialkylsiloxanes). Combinations of these reactions can be used to produce a wide variety of the structures of Formulae II, III, and IV, x and y each independently being a positive integer. Poly(dimethylsiloxane bis[[3-[(2-aminoethyl)amino]propyl]dimethoxy silyl]ether is available from Aldrich Chemicals, Milwaukee Wis. or from Wacker Company, Duncan, S.C.

The reaction of Formula I, with Formula II, III or IV will provide a fluorocarbon-grafted poly(alkylsiloxane) of any viscosity. For ease of application perfluoroalkylsulfonamide-grafted poly(alkylsiloxanes) having a viscosity between about 10 and about 10000 mPa·s are preferred, and most preferred are those having a viscosity between about 500 and about 5000 mPa·s.

The present invention further comprises a process for the preparation of a perfluoroalkylsulfonamide-grafted poly (alkylsiloxane) comprising contacting (with stirring and with or without heating) one or more poly(dialkylsiloxanes) having amine-terminated side chains or terminal end group(s) as described above in Formula II, III, or IV with one or more polyfluoroalkyl sulfonyl halides in the presence of a solvent, and optionally an acid receptor, at a temperature of from about 10° C. to about 90° C. If an acid receptor is employed, it is then removed by washing and/or filtration. The solvent is then displaced with a volatile solvent selected from the groups comprising simple alcohols and ketones or simply water to form a solution or a dispersion of the reaction product in the selected solvent(s).

Suitable solvents useful in the practice of the present invention are toluene, xylene, propan-1-ol, propan-2-ol, 1-methoxy-2-propanol (available as DOWANOL PM) or 1-methoxy-2-acetoxypropane (DOWANOL DPM), both available from Dow Chemical Co., Midland Mich. Toluene is preferred. The solvent may be removed by evaporation, or the solution may be retained for dilution and application to the substrate. The perfluoroalkylsulfonamide-grafted poly(alkylsiloxane) is then dispersed or dissolved in a volatile "application solvent" selected from the groups comprising simple alcohols and ketones that are suitable as the solvent for final application to substrates (the application solvent). A preferred application solvent is isopropyl alcohol.

Alternatively, an aqueous dispersion, made by conventional methods with surfactants, is prepared by removing solvents by evaporation and the use of emulsification or homogenization procedures well known to those skilled in the art. Such solvent-free emulsions may be preferred to minimize flammability and volatile organic compounds (VOC).

The final product used for application to a substrate is a dispersion (if water based) or a solution (if solvents other than water are used) of the perfluoroalkylsulfonamide-grafted poly(alkylsiloxane).

Suitable acid receptors useful in the practice of the present invention are trialkylamines and basic ion exchange resins. Examples are trimethylamine and AMBERLYST A21, a tert-amine divinylbezene/styrene ion exchange copolymer, available from Rohm & Haas, Philadelphia, Pa. The hydrohalide form of the acid receptor is removed from the reaction product by washing with water and/or by filtration.

The dispersion of perfluoroalkylsulfonamide-grafted poly (alkylsiloxane) in the application solvent is further diluted as necessary with the application solvent to provide a solution or dispersion with a concentration of the perfluoroalkylsulfonamide-grafted poly(alkylsiloxane) of from about 1% to about 10% percent by weight for application to the substrate. Typically, a concentration of about 2% by weight of the perfluoroalkylsulfonamide-grafted poly(alkylsiloxane), in isopropyl alcohol solution or as an aqueous dispersion, is used for application to the substrate.

Optionally, the dispersion or solution as applied to the substrate can also contain adhesion promoters such as an epoxy silane (for example, 3-glycidyloxypropyl-trimethoxysilane), or a crosslinking agent such as a di-epoxy.

Examples of suitable di-epoxies are:
poly[oxy(dimethylsilynene)],-[dimethyl[3-(oxiranylmethoxy)propyl]silyl],-[[dimethyl[3-(oxiranylmethoxy)propyl]silyl]oxy];
dipropylene glycol diglycidil ether; and
poly[oxy(methyl-1,2-ethanediyl)],-(oxiranylmethyl),-(oxiranylmethoxy).

Additional examples of suitable di-epoxies that react at room temperature are EPIKOTE 828 and a 10% solution of EPIKOTE 828 in xylene (EPIKOTE-X-90), both available from Resolution Performance Products, Houston Tex.). EPIKOTE 828 is a reaction product of 4,4'-isopropylidenediphenol(bisphenol A) with epichlorohydrin.

The present invention further comprises a method of providing water repellency, oil repellency and stain resistance to a substrate comprising contacting the perfluoroalkylsulfonamide-grafted poly(alkylsiloxane) solutions or dispersions of the present invention with the surface of the substrate. Suitable substrates include hard surfaces and soft fibrous surfaces. Hard surfaces include porous and non-porous mineral surfaces, such as glass, stone, masonry, concrete, unglazed tile, brick, porous clay and various other substrates with surface porosity. Specific examples of such substrates include unglazed concrete, brick, tile, stone (including granite and limestone), grout, mortar, marble, limestone, statuary, monuments, wood, composite materials such as terrazzo, and wall and ceiling panels including those fabricated with gypsum board. These are used in the construction of buildings, roads, parking ramps, driveways, floorings, fireplaces, fireplace hearths, counter tops, and other decorative uses in interior and exterior applications. Wood can also be treated. Fibrous surfaces include textile, fiber, nonwoven, paper, fabric, carpet and leather substrates. Specific examples of fibrous substrates include fabrics and carpets made from 1) natural fibers such as wool, cotton, jute, sisal, sea grass, coir, and blends thereof, and 2) synthetic fibers such as polyamides, polyaramides, polyesters, polyolefins, acrylics and blends thereof.

The present invention further comprises hard and fibrous surfaces treated with the perfluoroalkylsulfonamide-grafted poly(alkylsiloxane) solution or dispersion as described above.

The diluted solution is applied to the substrate surface by any suitable method. Such methods are well known to those skilled in the art, and include, but are not limited to, application by brush, roller, spray, dipping, immersion, and the like. Application rates for the perfluoroalkylsulfonamide-grafted poly(alkylsiloxane) solution or dispersion are in the range of from about 10 to about 1000 g/m$^2$ depending on the substrate porosity. The substrate surface is dried. Prior to testing for oil, water, and stain repellency, the substrate is allowed to dry for about 16 to about 48 hours, to allow fluorinated telomers to reach their equilibrium conformation on the substrate surface.

The perfluoroalkylsulfonamide-grafted poly(alkylsiloxane) compositions of the present invention are useful to provide excellent oil, water, and stain repellency to treated substrates, and a "good hand" to soft surfaces such as textiles and leathers. The term "good hand" is used to describe an attractive soft or silky feel of textiles and leathers. This excellent oil, water, and stain repellency and good hand is obtained using lower fluorine concentrations compared with conventional perfluorocarbon surface treatments, providing improved "fluorine efficiency" in the protection of treated surfaces. The perfluoroalkylsulfonamide-grafted poly(alkylsiloxane)s of the present invention are effective at fluorine concentrations about one-third to one quarter of the fluorine concentration for conventional fluorochemical surface protectants. As an example of this improved fluorine efficiency, compositions of this invention, having a fluorine concentration of 0.21%, provided equal oil, water, and stain repellency to test substrates as substrates treated with a conventional surface protectant dispersion of a copolymer of perfluoroalkylethylacrylate/dimethylaminoethylmethacrylate/vinyl acetate, having a fluorine content of 0.96%.

MATERIAL AND TEST METHODS

The following materials were used in the examples hereinafter.

Polysiloxane AF16 is available from Wacker, Duncan, S.C. or Aldrich Chemicals, Milwaukee Wis.

Dispersions of perfluoroalkylethylacrylate/dimethylaminoethylmethacrylate/vinyl acetate are available from E. I. du Pont de Nemours and Company, Wilmington Del.

TEEPOL is available from Johnson Diversey, Fortenay-sous-Bois, France.

Perfluoroalkylethylsulfonic acid and mixed perfluoroalkylethylsulfonic acids used to prepare perfluorohexylethylsulfonyl chloride, and mixtures of perfluorobutylethylsulfonyl chloride, perfluorohexylethylsulfonyl chloride, perfluorooctylethylsulfonyl chloride, perfluorodecylethylsulfonyl chloride, perfluorododecylethylsulfonyl chloride, and perfluorotetradecylethylsulfonyl chloride are available from E. I. du Pont de Nemours and Company, Wilmington Del.

Sources of stains are shown in Table 3, below.

Test Method 1. Water Repellency Test

Application of the test liquid is made to horizontal substrates at room temperature and ambient humidity, and allowed to dry for at least 24 h. A minimum of three droplets is evaluated. The test liquids are mixtures of deionized water and 99% isopropanol as shown in Table 1.

TABLE 1

Water Repellency Test Liquids

| Test Liquid # | Deionised water (% by weight) | Isopropanol (% by weight) |
| --- | --- | --- |
| 1 | 90 | 10 |
| 2 | 80 | 20 |
| 3 | 70 | 30 |
| 4 | 60 | 40 |
| 5 | 50 | 50 |
| 6 | 40 | 60 |
| 7 | 30 | 70 |
| 8 | 20 | 80 |
| 9 | 10 | 90 |
| 10 | 0 | 100 |

Three drops of Test Liquid 1 are placed on the treated substrate. After 30 s, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 2. Oil Repellency Test

This test is based on American Association of Textile Chemists and Colorists, AATCC 118. Application of the test liquid is made to horizontal substrates at room temperature and ambient humidity, and allowed to dry for at least 24 h. A minimum of three droplets is evaluated. The liquids used for the test are eight oily liquids with different surface energies, listed in Table 2. Higher numbers have lower surface energies, and higher scores indicate greater oil repellency.

TABLE 2

Test Oil Compositions.

| Test Oil # | Oil Composition |
|---|---|
| 1 | Vaseline oil |
| 2 | Vaseline oil/n-Hexadecane (65/35) |
| 3 | n-Hexadecane |
| 4 | n-Tetradecane (minimum purity 95%) |
| 5 | n-Dodecane (minimum purity 99%) |
| 6 | n-Decane (minimum purity 95%) |
| 7 | n-Octane (minimum purity 99%) |
| 8 | n-Heptane (minimum purity 99%) |

Three drops of Test Oil 1 are placed on the treated substrate. After 30 s, the drops are removed by using vacuum aspiration. If no liquid penetration or partial absorption (appearance of a darker wet patch on the substrate) is observed, the test is repeated with Test Liquid 2. The test is repeated with Test Oil 3 and progressively higher Test Oil numbers until liquid penetration (appearance of a darker wet patch on the substrate) is observed. The test result is the highest Test Liquid number that does not show liquid penetration into the substrate.

Test Method 3. Contact Angle Measurement

Glass samples of 76×26 mm, ISO-Norm 8037 with cut edges and ready-to-use (available as SUPERFROST microscope slides, from Microm International, Walldorf, Germany), are twice dipped for 30 s into the application solution or dispersion to be tested, allowing a drying time of 2 min. between dips. When epoxysilanes are used the glass samples are heated for 30 min. at 150° C. (subsequently referred to as a thermal treatment). The samples are then allowed to dry under ambient conditions for 48 hr. Three 40 microL drops of deionized water are applied at 23° C. and the contact angles are measured. Advancing contact angles were used. A higher contact angle indicates a more repellent surface.

Test Method 4. Contact Angle Measurement After Coating and Boiling

Glass samples are prepared as in Test Method 3, allowing a drying time of 2 min. between dips, then dried 10 min. at room temperature, 30 min. at 150° C., and finally 48 h at room temperature. The treated glass sample is immersed for 1 h in boiling water, followed by 1 h under running tap water flowing at 112 L/h onto the treated glass, and finally drying for 24 h at room temperature. Three 40 microL drops of deionized water are applied to the boiled and dried sample at 23° C. and the contact angles are measured. Advancing contact angles were used. A higher contact angle indicates a more repellent surface.

Test Method 5. Stain Test

Samples of treated and untreated (control) substrate are prepared and dried for 16 to 48 h at room temperature. Droplets of selected stains are applied to the treated surface and allowed to stay in contact with the substrate for 16 h at room temperature. The stains and sources are shown in Table 3. A petri dish is used to decrease the rate of evaporation from the stain during those 16 h.

The substrate samples are then cleaned using 2 mL of a 6 wt % solution of TEEPOL (see Materials, above) in deionized water that is sprayed onto the surface. A scrubbing brush is passed 50 times (50 strokes) over the substrate, using a pressure of 0.6 N/cm$^2$. The substrate is rinsed with tap water and then deionized water before the stain is evaluated. The surface where the stain droplets were applied is rated according to the following criteria shown in Table 4.

TABLE 3

Stains.

| Stain | Detail, Source |
|---|---|
| Red Colorant, 1% | DEC-A-CAKE, in deionized water, from Durkee French Foods, Paramus NJ |
| Coffee (cold) | O'CAFFE EXPRESSO, Italvi, Latina, Italy |
| Red Wine | Villaray rouge, Groupe Uccoar, Montréal, France |
| Ketchup (Heinz) | H J Heinz France, Paris, France |
| COCA COLA | CocaCola Entreprise, Issy-Les-Moulineaux, France |
| Dijon Mustard | Amora, Rueil Malmaison, France |
| Waterman Blue Ink | Waterman, Saint Herblain, France |
| Used Motor Oil | Total Fina Elf, Paris La Défense, France |
| Olive Oil | Groupe Auchan, Villeneuve d'Ascq, France |
| Geranium Flower Paste | Flowers from SA Leroy Merlin, Lezennes, France. Geranium petals, 50%, water 50%, ground together |

TABLE 4

Stain Scores.

| Score | Description |
|---|---|
| 5 | No perceptible stain |
| 4 | Stain slightly perceptible |
| 3 | Visible stain but the outline is not defined |
| 2 | Stain clearly delimited but not very deep. |
| 1 | Stain clearly delimited and very deep |

EXAMPLES

Example 1

To a double-jacketed 1 L-reactor was added toluene (136 g), triethylamine (6.22 g, 6.16×10$^{-2}$ mole), and polysiloxane AF16 (100 g). The temperature was raised to and held at 45° C. A solution of perfluorohexylethylsulfonyl chloride ($C_6F_{13}C_2H_4SO_2Cl$, 22.9 g, 5.13×10$^{-2}$ mole) in toluene (34.35 g) was prepared and injected into the reactor during a two-hour period. When the injection was complete the temperature was raised to and maintained at 70° C. for 2.5 h. The triethyl ammonium chloride and excess triethylamine were removed by washing sequentially and an equal volume of aqueous hydrochloric acid (pH about 3), aqueous sodium hydroxide (pH about 10), and then three times with water. The toluene phase, containing the perfluoroalkylsulfonamide-grafted poly(alkylsiloxane), was diluted in isopropanol in order to get a 2% solution on a dry weight basis.

Example 2

The procedure of Example was repeated except that the triethylamine was replaced by AMBERLYST A21 resin (22.19 g) in the basic (hydroxide) form. After the 2.5-hour period at 70° C., the reaction product was filtered to remove the AMBERLYST A21. After filtration, toluene phase was diluted with isopropanol as in Example 1.

Example 3

A terra cotta tile (30×30 cm), available from Guiraud Frèeres, F-31250, Revel, France, was treated with 100 g/m² of a solution containing 2 weight % of the perfluoroalkylsulfonamide-grafted poly(alkylsiloxane) prepared according to the procedure of Example 1 and the appropriate amount of isopropanol to have 100 g of solution. This solution had a fluorine content of 0.208%. The solution was applied with a brush. After 24 h, the water and oil repellencies were measured (Test Methods 1 and 2, respectively). Five droplets of the test solutions were applied to a single treated tile for each Test Method and the results averaged. Results are shown in Table 5.

Comparative Example A

A terra cotta tile, as in Example 3, was treated with 100 g/m² of a solution containing 2 weight % of a copolymer of perfluoroalkylethylacrylate/dimethylaminoethylmethacrylate/vinyl acetate and the appropriate amount of water to have 100 g of solution. This solution had a fluorine content of 0.96%. The solution was applied with a brush. After 24 h, the water and oil repellencies were measured using Test Methods 1 and 2, respectively. Five droplets of the test solutions were applied to a single treated tile for each Test Method and the results averaged. Results are shown in Table 5.

TABLE 5

Water and Oil Repellencies.

| Example | % F in the applied solution | Water Repellency (Test Method 1) | Oil Repellency (Test Method 2) |
|---|---|---|---|
| 3 | 0.208 | 10 | 8 |
| Comp Ex. A | 0.96 | 10 | 8 |

Table 5 shows equivalent protection by the compositions of the present invention at lower % F concentrations.

Comparative Example B

A microscope slide of dimensions 56×26×0.5 mm was used without treatment with any perfluoroalkylsulfonamide-grafted poly(alkylsiloxane). Advancing contact angle measurements were performed according to Test Method 3 (no thermal treatment was necessary for this control) in a controlled temperature room at 23° C. with deionized water. The low internal advancing contact angle, measured 3 times on the untreated glass control, indicated a highly wettable surface. Results are shown in Table 6, below.

Comparative Example C

A solution containing 2 weight % of a copolymer of perfluoroalkylethylacrylate/dimethylaminoethylmethacrylate/vinyl acetate and the appropriate amount of water was prepared. This solution had a fluorine content of 0.96%. A glass microscope slide of dimensions 56×26×0.5 mm was immersed in the solution for 30 seconds and allowed to remain at room temperature for 48 h. Advancing contact angle measurements were performed according to Test Method 3 (no thermal treatment was necessary for this control) in a controlled temperature room at 23° C. with deionized water. The internal advancing contact angle, measured 3 times on the treated glass, showed a highly water repellent surface. Results are reported in Table 6, below.

Example 4

A solution containing 2 g of the perfluoroalkylsulfonamide-grafted poly(alkylsiloxane), prepared according to the procedure of Example 1 and the required amount of isopropanol to have a 100 g total mass of solution was prepared. The solution had a fluorine content of 0.208%.

Three glass microscope slides of dimensions 56×26×0.5 mm were immersed in the solution for 30 seconds and allowed to remain at room temperature for 48 h. Advancing contact angle measurements were performed according to Test Method 3 (no thermal treatment was necessary for this Example) in a controlled temperature room at 23° C. with deionized water. The internal advancing contact angle, measured 3 times on each treated glass, showed a highly water repellent surface. Results are reported in Table 6, below. Example 4 showed the same order of magnitude as for the copolymer of perfluoroalkylethylacrylate/dimethylaminoethylmethacrylate/vinyl acetate (comparative Example C) but with much lower fluorine content.

TABLE 6

Contact Angle Measurements

| Example | % F in the applied solution | Advancing Contact angle (measured thrice) |
|---|---|---|
| Comp. Ex. B, glass 7 | 0 | 5°, 2°, 7° [Avg. 4.7°] |
| Comp. Ex. C, glass 5 | 0.96 | 104°, 104°, 105° [Avg. 104.3°] |
| Ex 4, glass 1 | 0.208 | 111°, 111°, 116° [Avg. 112.7°] |
| Ex 4, glass 2 | 0.208 | 110°, 111°, 116° [Avg. 112.3°] |
| Ex 4, glass 3 | 0.208 | 112°, 119°, 116° [Avg. 115.7°] |

Table 6 shows equivalent protection by the compositions of the present invention at lower fluorine concentrations. Higher advancing contact angles denote increased water repellency.

Example 5

A solution containing 2 g of the perfluoroalkylsulfonamide-grafted poly(alkylsiloxane), prepared according to the procedure of Example 2 and the required amount of isopropanol to have a 100 g total mass of solution was prepared. The solution had a fluorine content of 0.184%.

Two glass microscope slides of dimensions 56×26×0.5 mm were immersed in the solution for 30 seconds. Advancing contact angle measurements were performed according to Test Method 3 (with thermal treatment) in a controlled temperature room at 23° C. with deionized water. The internal advancing contact angle, measured 3 times on the treated glass, showed a highly water repellent surface. Results are reported in Table 7, below.

Example 6

A solution containing 2 g of the perfluoroalkylsulfonamide-grafted poly(alkylsiloxane), prepared according to the procedure of Example 2 and the required amount of isopropanol to have a 100 g total mass of solution was prepared. The solution had a fluorine content of 0.184%.

Two glass microscope slides of dimensions 56×26×0.5 mm were immersed in the solution for 30 seconds. Advancing contact angle measurements were performed according to Test Method 4 in a controlled temperature room at 23° C. with deionized water. The internal advancing contact angle, measured 3 times on the treated glass, showed a highly water repellent surface. Results are reported in Table 7, below.

Example 7

A solution containing 1.6 g of the perfluoroalkylsulfonamide-grafted poly(alkylsiloxane), prepared according to the procedure of Example 2, 0.4g of 3-glycidyloxypropyl-trimethoxysilane and the required amount of isopropanol to have a 100 g total mass of solution was prepared. The solution had a fluorine content of 0.147%.

Two glass microscope slides of dimensions 56×26×0.5 mm were immersed in the solution for 30 seconds. Advancing contact angle measurements were performed according to Test Method 3 (with thermal treatment) in a controlled temperature room at 23° C. with deionized water. The internal advancing contact angle, measured 3 times on the treated glass, showed a highly water repellent surface. Results are reported in Table 7, below.

Example 8

A solution containing 1.6 g of the perfluoroalkylsulfonamide-grafted poly(alkylsiloxane), prepared according to the procedure of Example 2, 0.4 g of 3-glycidyloxypropyl-trimethoxysilane and the required amount of isopropanol to have a 100 g total mass of solution was prepared. The solution had a fluorine content of 0.147%.

Two glass microscope slides of dimensions 56×26×0.5 mm were immersed in the solution for 30 seconds. Advancing contact angle measurements were performed according to Test Method 4 in a controlled temperature room at 23° C. with deionized water. The internal advancing contact angle, measured 3 times on the treated glass, showed a highly water repellent surface. Results are reported in Table 7, below.

Each of the examples 5, 6, 7, and 8 were reproduced on 2 different microscope slides and contact angles were measured on 3 different areas of the treated glass to check the reproducibility of the contact angle measurements. Data presented in Table 7 show good reproducibility. Higher contact angles denote higher water repellency.

TABLE 7

Contact Angle Measurements

| Example | % F in the applied solution | Advancing Contact angle (measured thrice) | Average Contact Angle |
|---|---|---|---|
| Ex 5, glass A | 0.208 | 112°; 115°; 119° | 115.8° |
| Ex 5, glass B | 0.208 | 119°; 115°; 115° | |
| Ex 6, glass A | 0.208 | 98°; 96°; 99° | 99.0° |
| Ex 6, glass B | 0.208 | 99°; 100°; 102° | |
| Ex 7, glass A | 0.147 | 113°; 108°; 105° | 108.5° |
| Ex 7, glass B | 0.147 | 106°; 109°; 110° | |
| Ex 8, glass A | 0.147 | 96°; 110°; 110° | 108.5° |
| Ex 8, glass B | 0.147 | 112°; 110°; 113° | |

Example 5 and 6 corresponded to glass treated with a perfluoroalkylsulfonamide-grafted poly(alkylsiloxane) without using any epoxysilane as an adhesion promoter. Example 6 showed contact angles measured after immersion of the treated microscope glass slides in boiling water for 1 h. For Example 5 this immersion in boiling water was not been conducted. As a consequence, the difference between contact angles of Examples 5 and 6 gave the effect of the immersion of the treated glass in boiling water on the contact angle. Table 7 shows that this immersion in boiling water lowered the contact angle by 17° (difference between the mean obtained for Example 5 and 6).

Examples 7 and 8 corresponded to glass treated with a perfluoroalkylsulfonamide-grafted poly(alkylsiloxane) used with an epoxysilane (3-glycidyloxypropyl-trimethoxysilane). Example 8 showed contact angles measured after immersion of the treated microscope glass slides in boiling water for 1 h. In Example 7 this immersion in boiling water was not been conducted. As a consequence, the difference between contact angles of Examples 8 and 7 gave the effect of the treated glass immersion in boiling water on the contact angle. Table 7 shows that this immersion did not lower the contact angle (difference between the mean obtained for Examples 7 and 8).

In conclusion, results reported in Table 7 showed that the use of an epoxysilane lowered the negative effect of the treated glass immersion in boiling water as applied in Examples 6 and 8. Additionally, even if the epoxysilane lowered the initial value of the contact angle (Example 5 average is 115.8° and Example 7 average is 108.5°), the contact angle after the treated glass immersion in boiling water remained higher when the epoxysilane was used. Example 6 (without epoxysilane) average was 99° and Example 8 (with epoxysilane) average was 108.5°.

Example 9

A terra cotta tile, as in Example 3, was treated with 100 g/m$^2$ of a solution containing 2 weight % of the perfluoroalkylsulfonamide-grafted poly(alkylsiloxane) prepared according to the procedure of Example 1 and the appropriate amount of isopropanol to have 100 g of solution. This solution had a fluorine content of 0.208%. The solution was applied with a brush. After 24 h, the water and oil repellencies and stain resistance were measured using Test Methods 1, 2 and 5 respectively. Multiple stain resistance tests were performed on the single tile. Results are shown in Table 8. A terra cotta tile was also treated and tested in the same manner using the composition of Comparative Example C described above. Results are shown in Table 8.

TABLE 8

| Test* | Ex. 9 Treated Tile | Comparative Ex. C |
|---|---|---|
| Water repellency (Method 1) | 10 | 10 |
| Oil repellency (Method 2) | 8 | 6 |
| Stain Resistance (Method 5) | | |
| Red Colorant | 5 | 2 |
| Coffee | 4.5 | 2 |
| Red Wine | 2.5 | 3 |
| Ketchup Heinz | 5 | 5 |
| Coca Cola | 4 | 4 |
| Mustard of Dijon | 5 | 5 |
| Watermann Blue Ink | 2 | 2.5 |
| Motor Oil (used) | 2.5 | 5 |
| Olive Oil | 4 | 5 |
| Geranium Flower Paste | 2 | 3.5 |
| Totaled scores | 54.5 | 53 |

*Stain sources, see Table 3 above.

Table 8 compares two different tiles treated with the same weight per square meter of polymer solution. However, while two solutions used in Example 9 and Comparative Example C have the same content in polymer, the Example 9 solution had a fluorine content of 0.208% and the Comparative Example C solution had a fluorine content of 0.91%. The total of the evaluations for Example 9 was slightly higher than the total of the evaluations for Comparative Example C. The polymer used in Example 9 requires only 23% of the fluorine in Comparative Example C.

Example 10

Example 10 was prepared as in Example 1 except that the perfluorohexylethylsulfonyl chloride was replaced by 26.3 g (5.13 $10^{-2}$ mol) of a mixture comprising perfluorobutylethylsulfonyl chloride (4%, all percentages are by weight), perfluorohexylethylsulfonyl chloride (50%), perfluorooctylethylsulfonyl chloride (29%), perfluorodecylethylsulfonyl chloride (11%), perfluorododecylethylsulfonyl chloride (4%), and perfluorotetradecylethylsulfonyl chloride (2%). After the last washing, the toluene phase was diluted with isopropanol as in Example 1.

What is claimed is:

1. A composition comprising a polymer prepared by contacting a polyfluoroalkyl sulfonyl halide of formula I $$R_f\text{—}R^1\text{—}SO_2X \qquad \text{I}$$

wherein
$R_f$ is a straight or branched perfluoroalkyl group having from about 2 to about 20 carbon atoms,
$R^1$ is a divalent linking group $C_kH_{2k}$ wherein k is 0 to about 20, and
X is halogen,
with a silane compound of Formula II, III or IV $$(E\text{-}(O)_q)_3Si\text{—}O\text{—}(Si(R^2)_2\text{—}O)_m\text{—}[Si(R^3\text{—}NHR^4)(R^2)O]_n\text{—}Si\text{—}((O)_q\text{-}E)_3 \qquad \text{Formula II}$$

$$HR^4N\text{—}R^3\text{—}Si(R^2)_2\text{—}O\text{—}[Si(R^2)_2\text{—}O]_m\text{—}[Si(R^3\text{—}NHR^4)(R^2)O]_n\text{—}Si(R^2)_2\text{—}R^3\text{—}NHR^4 \qquad \text{Formula III}$$

$$HR^4N\text{—}R^3\text{—}Si(R^2)_2\text{—}O\text{—}[Si(R^2)_2\text{—}O]_m\text{—}Si\text{—}((O)_q\text{-}E)_3 \qquad \text{Formula IV}$$

wherein
each $R^2$ is independently a $C_1$ to $C_8$ alkyl,
each $R^3$ is independently a divalent group containing carbon, oxygen, and optionally nitrogen, with proviso that $R^3$ does not contain sulfur,
each $R^4$ is independently H or $C_1$ to $C_8$ alkyl,
each E is independently a $C_1$ to $C_8$ branched or linear alkyl,
each q is independently zero or 1,
m is a positive integer, and n is independently a positive integer, such that n/(m+n) is a positive fraction having a value up to about 0.7, and the polymer viscosity is less than or equal to 10000 mPas under a shear rate of 0.1 s$^{-1}$ at a temperature of 20° C.;
wherein the sulfonylhalide is of the formula $F(CF_2)_pCH_2CH_2SO_2X$ and p is from about 2 to about 20, and mixtures thereof.

2. The composition of claim 1 wherein the sulfonylhalide is of the formula $F(CF_2)_pCH_2CH_2SO_2X$ wherein p is from about 2 to about 20, and mixtures thereof.

3. The composition of claim 1 wherein $R_f$ is a perfluoroalkyl group having from about 4 to about 16 carbon atoms.

4. The composition of claim 1 wherein the silane compound is a compound of Formula II $$(E\text{-}(O)_q)_3Si\text{—}O\text{—}(Si(R^2)_2\text{—}O)_m\text{—}[Si(R^3\text{—}NHR^4)(R^2)O]_n\text{—}Si\text{—}((O)_q\text{-}E)_3$$

wherein $R^2$, $R^3$, $R^4$, E, q, m and n are as defined in claim 1.

5. The composition of claim 1 having a viscosity of from about 500 to about 5000 mPas under a shear rate of 0.1 s$^{-1}$ at a temperature of 20 C.

6. The composition of claim 1 in the form of a dispersion or solution.

7. A process for the preparation of a perfluoroalkylsulfonamide-grafted poly(alkylsiloxane) comprising contacting a polyfluoroalkyl sulfonyl halide of formula I $$R_f\text{—}R^1\text{—}SO_2X \qquad \text{I}$$

wherein
$R_f$ is a straight or branched perfluoroalkyl group having from about 2 to about 20 carbon atoms,
$R^1$ is a divalent linking group $C_kH_{2k}$ wherein k is 0 to about 20, and
X is halogen,
with a silane compound of Formula II, III or IV $$(E\text{-}(O)_q)_3Si\text{—}O\text{—}(Si(R^2)_2\text{—}O)_m\text{—}[Si(R^3\text{—}NHR^4)(R^2)O]_n\text{—}Si\text{—}((O)_q\text{-}E)_3 \qquad \text{Formula II}$$

$$HR^4N\text{—}R^3\text{—}Si(R^2)_2\text{—}O\text{—}[Si(R^2)_2\text{—}O]_m\text{—}[Si(R^3\text{—}NHR^4)(R^2)O]_n\text{—}Si(R^2)_2\text{—}R^3\text{—}NHR^4 \qquad \text{Formula III}$$

$$HR^4N\text{—}R^3\text{—}Si(R^2)_2\text{—}O\text{—}[Si(R^2)_2\text{—}O]_m\text{—}Si\text{—}((O)_q\text{-}E)_3 \qquad \text{Formula IV}$$

wherein
each $R^2$ is independently a $C_1$ to $C_8$ alkyl,
each $R^3$ is independently a divalent group containing carbon, oxygen, and optionally at least one of nitrogen, and sulfur,
each $R^4$ is independently H or $C_1$ to $C_8$ alkyl,
each E is independently a $C_1$ to $C_8$ branched or linear alkyl,
each q is independently zero or 1,
m is a positive integer, and n is independently a positive integer, such that n/(m+n) is a positive fraction having a value up to about 0.7, and the polymer viscosity is less than or equal to 10000 mPas under a shear rate of 0.1 s$^{-1}$ at a temperature of 20° C.

8. The process of claim 7 further comprising contacting in the presence of an acid receptor.

9. The process of claim 8 wherein the acid receptor is a tertiary amine or base ion exchange resin.

10. A method of providing oil repellency, water repellency, and stain resistance to substrate surfaces comprising contacting said surface with a polymer prepared by contacting a polyfluoroalkyl sulfonyl halide of formula I $$R_f\text{—}R^1\text{—}SO_2X \qquad \text{I}$$

wherein
$R_f$ is a straight or branched perfluoroalkyl group having from about 2 to about 20 carbon atoms,
$R^1$ is a divalent linking group $C_kH_{2k}$ wherein k is 0 to about 20, and
X is halogen,
with a silane compound of Formula II, III or IV $$(E\text{-}(O)_q)_3Si\text{—}O\text{—}(Si(R^2)_2\text{—}O)_m\text{—}[Si(R^3\text{—}NHR^4)(R^2)O]_n\text{—}Si\text{—}((O)_q\text{-}E)_3 \qquad \text{Formula II}$$

$$HR^4N\text{—}R^3\text{—}Si(R^2)_2\text{—}O\text{—}[Si(R^2)_2\text{—}O]_m\text{—}[Si(R^3\text{—}NHR^4)(R^2)O]_n\text{—}Si(R^2)_2\text{—}R^3\text{—}NHR^4 \qquad \text{Formula III}$$

$$HR^4N\text{—}R^3\text{—}Si(R^2)_2\text{—}O\text{—}[Si(R^2)_2\text{—}O]_m\text{—}Si\text{—}((O)_q\text{-}E)_3 \qquad \text{Formula IV}$$

wherein
- each $R^2$ is independently a $C_1$ to $C_8$ alkyl,
- each $R^3$ is independently a divalent group containing carbon, oxygen, and optionally nitrogen, with proviso that $R^3$ does not contain sulfur,
- each $R^4$ is independently H or $C_1$ to $C_8$ alkyl,
- each E is independently a $C_1$ to $C_8$ branched or linear alkyl,
- each q is independently zero or 1,
- m is a positive integer, and n is independently a positive integer, such that n/(m+n) is a positive fraction having a value up to about 0.7, and the polymer viscosity is less than or equal to 10000 mPas under a shear rate of 0.1 s$^{-1}$ at a temperature of 20° C.;

wherein the sulfonylhalide is of the formula $F(CF_2)_n CH_2CH_2SO_2X$ and n is from about 2 to about 20, and mixtures thereof.

11. The method of claim 10 wherein the polymer is an aqueous dispersion or solution.

12. The method of claim 11 wherein the dispersion or solution further comprises an epoxysilane or a crosslinking agent.

13. The method of claim 10 wherein the polymer is applied at a concentration of from about 1% to about 10% by weight.

14. The method of claim 10 wherein the amount of polymer deposited on the substrate surface is from about 10 to about 1000 g/m².

15. The method of claim 10 wherein the contacting provides softness to textile and leather substrates.

16. A substrate treated according to the method of claim 10.

17. A substrate having a surface which has been contacted with a composition of claim 1.

18. The substrate of claim 16 which is a hard surface selected from the group consisting of mineral, glass, stone, masonry, concrete, unglazed tile, brick, clay, unglazed concrete, granite, limestone, grout, mortar, marble, limestone, statuary, monuments, wood, composites, terrazzo, and gypsum board.

19. The substrate of claim 16 which is a fibrous substrate selected from the group consisting of textile, fiber, nonwoven, paper, leather, fabric, and carpet.

20. A composition comprising a polymer prepared by contacting a polyfluoroalkyl sulfonyl halide of formula I

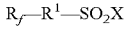

wherein
- $R_f$ is a straight or branched perfluoroalkyl group having from about 2 to about 20 carbon atoms,
- $R^1$ is a divalent linking group $C_kH_{2k}$ wherein k is 0 to about 20, and
- X is halogen, with a silane compound of Formula III

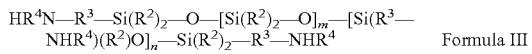   Formula III wherein
- each $R^2$ is independently a $C_1$ to $C_8$ alkyl,
- each $R^3$ is independently a divalent group containing carbon, oxygen, and optionally nitrogen, with proviso that $R^3$ does not contain sulfur,
- each $R^4$ is independently H or $C_1$ to $C_8$ alkyl,
- each q is independently zero or 1,
- m is a positive integer, and n is independently a positive integer, such that n/(m+n) is a positive fraction having a value up to about 0.7, and the polymer viscosity is less than or equal to 10000 mPas under a shear rate of 0.1 s$^{-1}$ at a temperature of 20° C.;

wherein the sulfonylhalide is of the formula $F(CF_2)_p CH_2CH_2SO_2X$ and p is from about 2 to about 20, and mixtures thereof.

* * * * *